United States Patent
Kim et al.

(10) Patent No.: US 9,815,463 B2
(45) Date of Patent: Nov. 14, 2017

(54) APPARATUS AND METHOD FOR CONTROLLING AUTO CRUISE SPEED OF VEHICLE

(71) Applicant: Hyundai Motor Company, Seoul (KR)

(72) Inventors: Sang Joon Kim, Seoul (KR); Jae Sung Bang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 14/927,662

(22) Filed: Oct. 30, 2015

(65) Prior Publication Data

US 2016/0159352 A1 Jun. 9, 2016

(30) Foreign Application Priority Data

Dec. 8, 2014 (KR) ........................ 10-2014-0174864

(51) Int. Cl.
    *B60T 8/24* (2006.01)
    *G05D 1/00* (2006.01)
    *G05D 5/00* (2006.01)
    *G06F 7/00* (2006.01)
    *G06F 17/00* (2006.01)
    (Continued)

(52) U.S. Cl.
    CPC ... *B60W 30/143* (2013.01); *B60W 2050/0008* (2013.01); *B60W 2050/0012* (2013.01); *B60W 2520/10* (2013.01); *B60W 2530/10* (2013.01); *B60W 2530/16* (2013.01); *B60W 2550/142* (2013.01); *B60W 2720/10* (2013.01); *B60W 2720/106* (2013.01); *B60W 2720/30* (2013.01)

(58) Field of Classification Search
    CPC . B60W 2050/0008; B60W 2050/0012; B60W 2520/10; B60W 2530/10; B60W 2530/16; B60W 2550/142; B60W 2720/106; B60W 2720/30; B60W 30/143
    USPC ........................................................... 701/94
    See application file for complete search history.

(56) References Cited

U.S. PATENT DOCUMENTS

| | | | | |
|---|---|---|---|---|
| 4,829,438 A | * | 5/1989 | Etoh ................... | B60K 31/047 |
| | | | | 123/352 |
| 4,922,428 A | * | 5/1990 | Takahashi ............ | B60K 31/107 |
| | | | | 180/178 |

(Continued)

FOREIGN PATENT DOCUMENTS

| JP | 1993-201269 | 8/1993 |
|---|---|---|
| JP | 2000-203307 A | 7/2000 |

(Continued)

*Primary Examiner* — Harry Oh
(74) *Attorney, Agent, or Firm* — Mintz Levin Cohn Ferris Glovsky and Popeo, P.C.; Peter F. Corless (57) ABSTRACT

A method for controlling an auto cruise speed of a vehicle includes: determining a feedback torque for correcting a speed error between a target speed set by a driver of the vehicle and a current speed that is a feedback speed detected by a speed sensor of a vehicle; determining a drive resistance according to the target speed by inputting the target speed; determining a first feedforward torque according to the determined drive resistance; determining a second feedforward torque based on a vehicle inertia and a variation of the target speed by inputting the target speed; and outputting a command for generating a wheel required torque that is corrected by adding the first feedforward torque and the second feedforward torque to the feedback torque.

10 Claims, 3 Drawing Sheets

(51) Int. Cl.
  *B60W 30/14*   (2006.01)
  *B60W 50/00*   (2006.01)

(56) References Cited

U.S. PATENT DOCUMENTS

| | | | | |
|---|---|---|---|---|
| 5,048,631 | A * | 9/1991 | Etoh | B60K 31/047 |
| | | | | 180/170 |
| 6,135,918 | A * | 10/2000 | Bellinger | B60W 10/06 |
| | | | | 477/107 |
| 7,021,410 | B2 * | 4/2006 | Hughes | B60K 6/48 |
| | | | | 180/65.25 |
| 7,223,204 | B2 * | 5/2007 | Steen | B60K 17/26 |
| | | | | 477/97 |
| 7,680,578 | B2 * | 3/2010 | Matsunaga | B60T 8/172 |
| | | | | 701/65 |
| 2009/0024263 | A1 * | 1/2009 | Simon, Jr. | B60K 6/485 |
| | | | | 701/22 |
| 2009/0048755 | A1 * | 2/2009 | Tokimasa | B60K 31/00 |
| | | | | 701/94 |
| 2010/0268432 | A1 * | 10/2010 | Arai | B60W 30/17 |
| | | | | 701/96 |
| 2014/0067211 | A1 * | 3/2014 | Kim | B60W 30/143 |
| | | | | 701/54 |
| 2014/0148986 | A1 * | 5/2014 | Yoshikawa | B60W 20/10 |
| | | | | 701/22 |
| 2014/0244083 | A1 * | 8/2014 | Kim | B60W 20/00 |
| | | | | 701/22 |

FOREIGN PATENT DOCUMENTS

| | | |
|---|---|---|
| JP | 2002-036907 A | 2/2002 |
| JP | 2002-225590 A | 8/2002 |
| JP | 2003-200752 A | 7/2003 |
| JP | 2004-276669 A | 10/2004 |
| JP | 2005-127424 A | 5/2005 |
| JP | 2008-273387 A | 11/2008 |
| JP | 2009-018681 A | 1/2009 |
| JP | 2010-234987 A | 10/2010 |
| JP | 4670594 B2 | 4/2011 |
| JP | 2011-094756 A | 5/2011 |

* cited by examiner

APPARATUS AND METHOD FOR CONTROLLING AUTO CRUISE SPEED OF VEHICLE

CROSS-REFERENCE TO RELATED APPLICATION

This application claims under 35 U.S.C. §119(a) the benefit of Korean Patent Application No. 10-2014-0174864 filed Dec. 8, 2014, the entire contents of which are incorporated herein by reference.

BACKGROUND (a) Technical Field

The present disclosure relates generally to an apparatus and method for controlling an auto cruise speed. More particularly, the present disclosure relates to an apparatus and method for controlling an auto cruise speed, which can improve the auto cruise control performance in a section where a target vehicle speed changes.

(b) Background Art

Generally, an auto cruise control system of a vehicle is an apparatus for maintaining a constant speed or controlling an automatic speed while driving. When a driver sets a target vehicle speed (e.g., with a switch operation, such as speed setting button), the auto cruise control system controls the speed of the vehicle at the set target vehicle speed, significantly reducing the accelerator pedal operation of a driver and thus improving the driving convenience.

In this auto cruise control system, when a speed controller generates a speed control torque (i.e., auto cruise torque) command according to the target vehicle speed, through cooperative control between controllers, internal combustion engine vehicles (e.g., gasoline- or diesel-fueled vehicles) perform engine torque control including fuel supply control based on the speed control torque, enabling auto cruise driving that maintains the target vehicle speed. Also, for the auto cruise control, electric vehicles driven using a motor control the motor torque based on the speed control torque, and hybrid vehicles driven using a motor and an engine distribute power to the motor and engine so as to generate the speed control torque.

Commonly, the vehicle torque control for the maintenance of the target vehicle speed is performed through feedback and feedforward control. When the torque control of a power unit (i.e., engine and/or motor) is performed for the auto cruise driving, a required torque for correcting an error according to the target speed (i.e., a difference between the current speed and the target speed of a vehicle) is generated in the feedback control through Proportional Integral (PI) (or Proportional Integral Derivative (PID)) control. The required torque is determined within an available torque range of the power unit through the PI (or PID) control in accordance with the difference between the current speed and the target speed of a vehicle.

Also, a torque corresponding to a drive resistance of a vehicle is converted in the feedforward control, and the required torque determined in the feedback control is pre-corrected. Thus, final auto cruise torques (e.g., speed control torque and final wheel required torque) are determined. More specifically, the speed control during the auto cruise driving is performed by controlling the torque output of the power unit based on the auto cruise torque (i.e., torque command) that is the sum of the feedforward torque and the feedback torque.

At this point, in the feedforward control process for calculating the feedforward torque, the target speed is inputted to determine the drive resistance from the target speed, and a load torque required in accordance with the drive resistance is calculated. Also, in the feedback control process for calculating the feedback torque, PI (or PID) control is applied to follow up the target speed of a vehicle.

Hereinafter, typical auto cruise control processes will be described with reference to FIGS. 1 and 2.

As described above, the auto cruise torque, i.e., the speed control torque for controlling the output of the power unit during the auto cruise speed control, is determined by 1) the feedback control for correcting the speed error of the target speed and the current speed of a vehicle and 2) the feedforward control for correcting the drive resistance of a vehicle. For this, a speed controller $1a$ of an auto cruise control system includes a feedback controller 10 determining a torque for correcting a speed error by inputting the speed error of the target speed and the current speed of a vehicle, and a feedforward controller 20 determining a torque for correcting a drive resistance by inputting the target speed.

Figure 1:
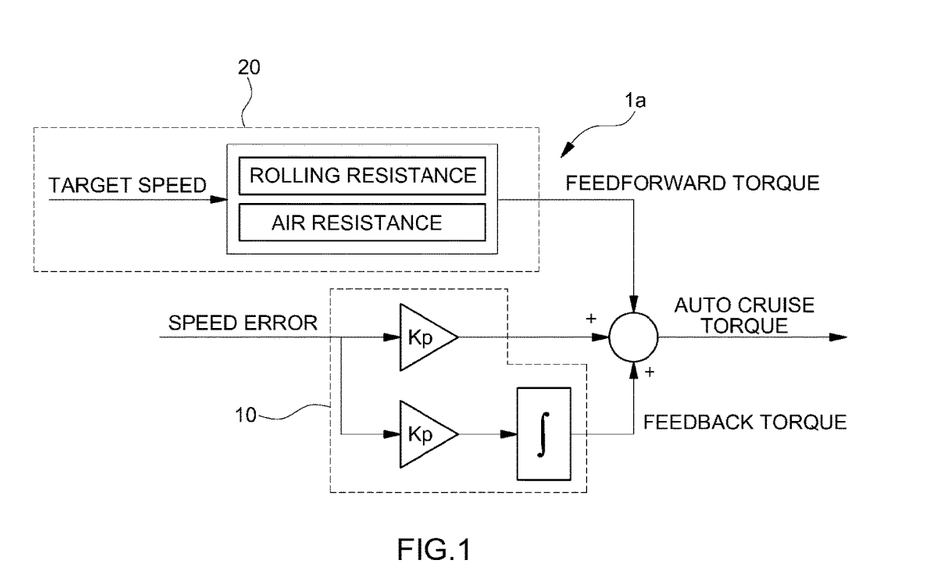
FIGS. 1 and 2 are views illustrating typical auto cruise control processes.

The drive resistance, as shown in FIG. 1, may include an air resistance and a rolling resistance. Also, in case of a vehicle equipped with a longitudinal acceleration sensor, the drive resistance, as shown in FIG. 2, may further include a slope resistance (i.e., gradient resistance) according to the road inclination angle (i.e., road slope). The rolling resistance and the air resistance are pre-calculated values in consideration of the hardware characteristics of the vehicle, and are determined in accordance with the vehicle speed. The slope resistance is determined in accordance with the road inclination angle calculated using a signal of the longitudinal acceleration sensor.

In this case, the longitudinal acceleration of a vehicle, which is a value sensed by the longitudinal acceleration sensor, is used for obtaining the road inclination angle θ together with the vehicle acceleration calculated from the vehicle speed. The road inclination angle may be expressed as the Equation below.

$$\theta = \frac{1}{g}(\text{longitudinal acceleration} - \text{vehicle acceleration})$$

Here, g denotes a gravitational acceleration.

The torque for correction of the drive resistance, which is determined by the feedforward controller 20, is a torque that allows a net torque that is applied to the wheel shaft of a vehicle by the drive resistance to become 0, and is determined as a torque corresponding to the drive resistance (i.e., rolling resistance+air resistance+slope resistance) of a vehicle.

Figure 2:
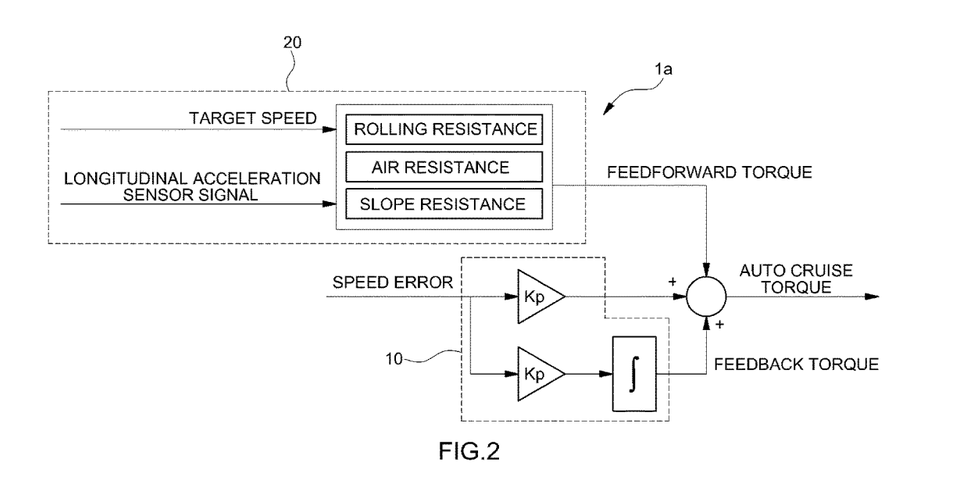

Finally, as shown in FIGS. 1 and 2, when the feedforward torque according to the drive resistance of a vehicle is determined in the feedforward controller 20, and the feedback torque is determined through the PI (or PID) control for removing the error between the target speed and the current speed of a vehicle in the feedback controller 10 (i.e., PI (or PID) controller), the auto cruise torque (i.e., wheel required torque) for maintaining the vehicle speed at the target speed is finally determined as the sum of the feedforward torque and the feedback torque, which are determined as above.

Meanwhile, the conventional auto cruise control system has the following limitations. For instance, the speed controller is designed based on the follow-up characteristics with respect to a constant target speed. Accordingly, in a situation where the target speed upwardly varies (in a form of lamp, for example) in accordance with the operation of auto cruise control functions such as "Acceleration", "Deceleration", "Tap-up", "Tap-down", and "Resume", the control response is reduced, and the speed control performance of auto cruise is reduced. More specifically, in order to increase the target speed, a driver needs to operate a speed setting button such as "Acceleration" or "Tap-up". Here, the operation "Acceleration" means that the target speed continuously increases while a driver is pushing the button, while the operation "Tap-up" means that the target speed increases by stages as much as a predetermined basic unit speed (e.g., 1 km/h) whenever the button is shortly pushed. When a driver intends to significantly increase the target speed, a driver may perform the "Acceleration" function closely to a desired target speed, and then may perform the "Tap-up" function to accurately set the target speed.

On the other hand, in order to decrease the target speed, a driver needs to operate a speed setting button such as "deceleration" or "Tap-down". Here, the operation "deceleration" means that the target speed continuously decreases while a driver is pushing the button, while the operation "Tap-down" means that the target speed decreases by stages as much as the predetermined basic unit speed (e.g., 1 km/h) whenever the button is shortly pushed. When a driver intends to significantly decrease the target speed, a driver may perform the "deceleration" function closely to a desired target speed, and then may perform the "Tap-down" function to accurately set the target speed.

Also, the "Resume" function means that the target speed returns to a previous target speed which was used for the speed control.

Figure 3:
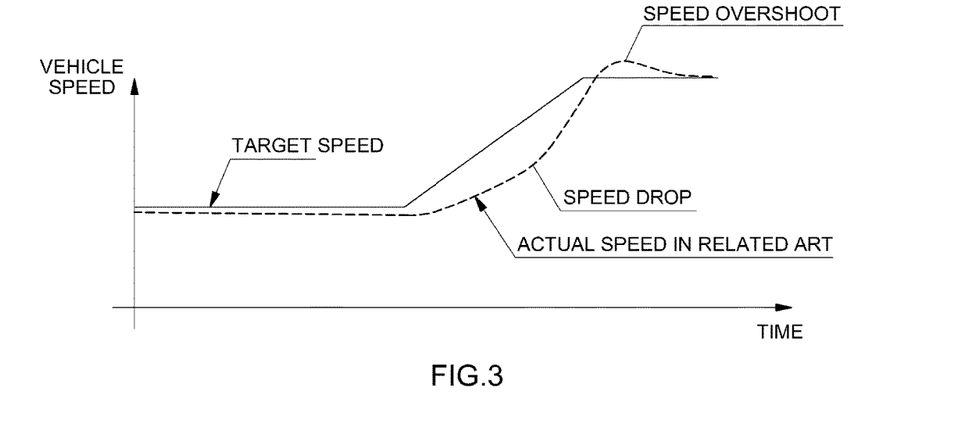
FIG. 3 is a view for describing limitations according to the related art.

FIG. 3 is a view illustrating limitations of the related art. When the target speed increases or decreases (e.g., in a form of lamp) through the foregoing operation in the auto cruise control system, speed drop and overshoot may occur as shown in FIG. 3 while the speed error is being corrected during the feedback control process.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure provides an apparatus and method for controlling an auto cruise speed, which can improve the auto cruise control performance in a section where a target vehicle speed varies (e.g., in a form of lamp) and can improve the speed follow-up performance and the control response in regard to the target vehicle speed.

According to embodiments of the present disclosure, an apparatus for controlling an auto cruise speed of a vehicle includes: a feedback controller determining a feedback torque for correcting a speed error between a target speed set by a driver of the vehicle and a current speed that is a feedback speed detected by a speed sensor of a vehicle; a first feedforward controller determining a drive resistance according to the target speed by inputting the target speed and determining a first feedforward torque according to the determined drive resistance; and a second feedforward controller determining a second feedforward torque based on a vehicle inertia and a variation of the target speed by inputting the target speed, wherein the apparatus outputs a command for generating a wheel required torque that is corrected by adding the first feedforward torque and the second feedforward torque to the feedback torque.

Furthermore, according to embodiments of the present disclosure, a method for controlling an auto cruise speed of a vehicle includes: determining a feedback torque for correcting a speed error between a target speed set by a driver of the vehicle and a current speed that is a feedback speed detected by a speed sensor of a vehicle; determining a drive resistance according to the target speed by inputting the target speed; determining a first feedforward torque according to the determined drive resistance; determining a second feedforward torque based on a vehicle inertia and a variation of the target speed by inputting the target speed; and outputting a command for generating a wheel required torque that is corrected by adding the first feedforward torque and the second feedforward torque to the feedback torque.

Furthermore, according to embodiments of the present disclosure, a non-transitory computer readable medium containing program instructions for controlling an auto cruise speed of a vehicle includes: program instructions that determine a feedback torque for correcting a speed error between a target speed set by a driver of the vehicle and a current speed that is a feedback speed detected by a speed sensor of the vehicle; program instructions that determine a drive resistance according to the target speed by inputting the target speed; program instructions that determine a first feedforward torque according to the determined drive resistance; program instructions that determine a second feedforward torque based on a vehicle inertia and a variation of the target speed by inputting the target speed; and program instructions that output a command for generating a wheel required torque that is corrected by adding the first feedforward torque and the second feedforward torque to the feedback torque.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Reference numerals set forth in the Drawings includes reference to the following elements as further discussed below:

1: speed control apparatus
10: feedback controller
20: first feedforward controller
30: second feedforward controller It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that those skilled in the art can easily carry out the present disclosure.

The present disclosure relates to an apparatus and method for controlling an auto cruise speed is mainly characterized in that a torque for securing the control response according to the variation of a target speed is additionally generated. More specifically, a feedforward torque may be additionally generated in consideration of inertia moment of a vehicle according to the variation of the target speed, and thus, the control response during the variation of the target speed may be improved.

Figure 4:
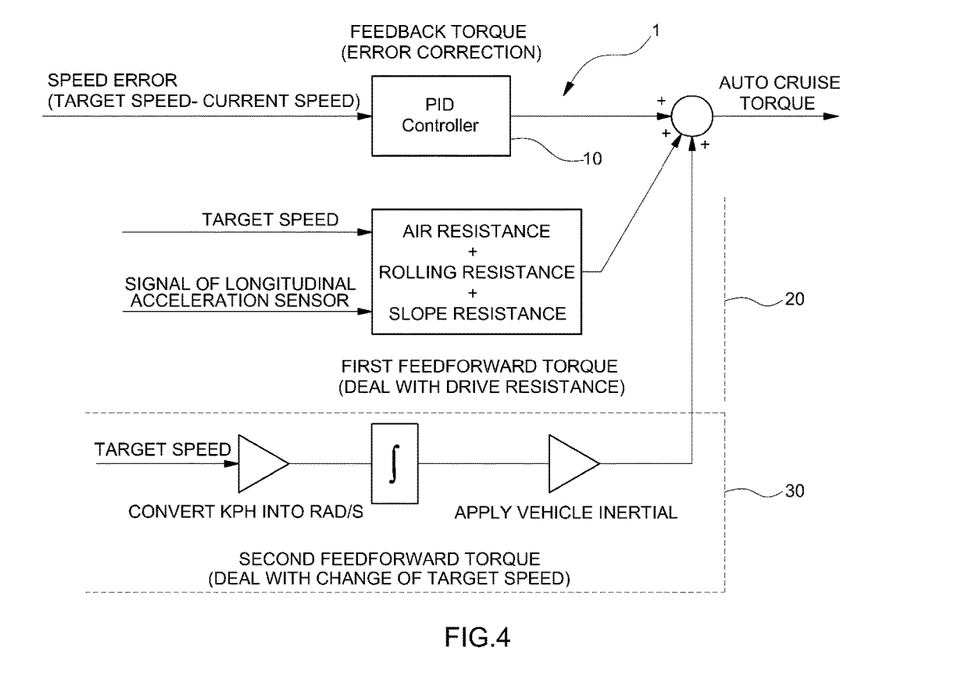
FIG. 4 is a view illustrating an auto cruise speed control apparatus and process according to embodiments of the present disclosure.

Referring now to the disclosed embodiments, FIG. 4 is a view illustrating an auto cruise speed control apparatus and process according to embodiments of the present disclosure.

In this regard, feedback control that generates a feedback torque for allowing an actual speed to follow up a target speed of a vehicle may be performed. The feedback torque may be a torque for correcting a speed error between the target speed and the current speed (i.e., vehicle speed that is fed back) of a vehicle during the auto cruise speed control. Also, a first feedforward control that generates a first feedforward torque for correcting a drive resistance of a vehicle, and a second feedforward control that generates a second feedforward torque based on an inertia moment of a vehicle according to the variation of the target speed of a vehicle may be performed. Here, the output of a power unit may be controlled such that the vehicle speed is maintained at the target speed based on an auto cruise torque (or wheel required torque), i.e., a speed control torque, which is determined through the feedback control and the first and second feedforward controls.

The feedback control process and the first feedforward control process may be equal to a typical feedback control process for correcting a speed error and a typical feedforward control process for dealing with a drive resistance, and there may also be no difference therebetween in a device configuration for performing the processes. However, according to the disclosed embodiments, a second feedforward control process may be added. For this, an auto cruise speed control apparatus 1 may include a feedback controller 10 that determines a feedback torque for correcting a speed error by inputting a speed error between a target speed and a current speed (i.e., feedback speed) of a vehicle, a first feedforward controller 20 that determines a drive resistance according to the target speed by inputting the target speed and determines a first feedforward torque according to the determined drive resistance, and a second feedforward controller 30 that determines a second feedforward torque considering a vehicle inertia according to the variation of the target speed of a vehicle by inputting the target speed.

The feedback controller 10 may become a Proportional Integral Derivative (PID) controller for removing an error between the target value and the feedback value, or may also become a Proportional Integral (PI) controller without the term D. The feedback controller 10 may perform feedback control for removing the speed error between the target speed and the current speed (i.e., value detected by a vehicle speed sensor) that is the feedback speed of a vehicle, and may determine a feedback torque for correcting the speed error from the speed error obtained from the current speed detected from a speed sensor, i.e., a signal of the speed sensor which is a feedback signal.

Also, the first feedforward controller 20 may convert a torque corresponding to the drive resistance of a vehicle in the target speed, and may pre-correct the feedback torque, i.e., a wheel required torque determined during the feedback control. The drive resistance may include an air resistance and a rolling resistance. In case of a vehicle equipped with a longitudinal acceleration sensor (not shown), the drive resistance, as shown in FIG. 4, may further include a slope resistance (i.e., gradient resistance) according to the road inclination angle (i.e., road slope).

The rolling resistance may be a drive resistance value that is calculated in consideration of the hardware characteristics of a vehicle, and the air resistance may be a drive resistance value that is determined in accordance with the vehicle speed. The slope resistance may be determined in accordance with the road inclination angle that is calculated using a signal of the longitudinal acceleration sensor.

The longitudinal acceleration of a vehicle, which is a value sensed by the longitudinal acceleration sensor, is used for obtaining the road inclination angle θ together with the vehicle acceleration calculated from the vehicle speed. In this case, the road inclination angle may be expressed as Equation (1) below.

$$\theta = \frac{1}{g}(\text{longitudinal acceleration} - \text{vehicle acceleration}) \quad (1)$$

Here, g denotes a gravitational acceleration.

Also, the rolling resistance may be calculated from the weight of a vehicle by Equation (2) below.

$$F_{rolling} = R\mu_{tire} m_{vehicle} g \quad (2)$$

Here, $F_{rolling}$ denotes the rolling resistance, and R denotes the radius (or dynamic radius) of tire. $\mu_{tire}$ denotes the frictional coefficient of tire, and $m_{vehicle}$ denotes the weight of a vehicle. Also, g denotes the gravitational acceleration.

Also, the air resistance may be calculated from the target speed of a vehicle by Equation (3) below.

$$F_{aerodynamic} = 1/2 R\rho_{air} C_d A v^2 \quad (3)$$

Here, $F_{aerodynamic}$ denotes the air resistance, and R denotes the radius (or dynamic radius) of tire. $\rho_{air}$ denotes the air density, and $C_d$ denotes the air resistance coefficient. Also, A denotes the surface area of a vehicle making contact with air, and v denotes the target speed of a vehicle.

Also, the slope resistance may be calculated from the road inclination angle by Equation (4) below.

$$F_{climbing} = R m_{vehicle} g \sin\theta \quad (4)$$

Here, $F_{climbing}$ denotes the slope resistance, and R denotes the radius (or dynamic radius) of tire. $m_{vehicle}$ denotes the weight of a vehicle, and g denotes the gravitational acceleration. Also, θ denotes the road inclination angle.

The first feedforward torque for correction of the drive resistance, which is determined by the first feedforward controller 20, may be a torque that allows a net torque that is applied to the wheel shaft of a vehicle by the drive resistance to become 0, and may be determined as a torque corresponding to the drive resistance (i.e., rolling resistance+air resistance+slope resistance) of a vehicle.

The second feedforward torque may be a feedforward torque considering the inertia moment of a vehicle according to the variation of the target speed. When there is a change in the target speed, the second feedforward controller 30 may determine the second feedforward torque for securing the control response using information on the variation of the target speed and the inertia characteristic value by inputting the target speed. The second feedforward controller 30 may determine the second feedforward torque so as to generate the second feedforward torque only when the target speed changes. In this case, information on the change rate of the target speed may be used.

The change rate may become the ascent gradient or the descent gradient of the variation of the target speed and may be obtained by differentiating the target speed. More specifically, the target speed of km/h unit may be converted into a target vehicle wheel speed in units of rad/s, and then may be differentiated with respect to time to obtain the speed change rate. Then, the speed change rate may be multiplied by the inertia moment of a vehicle which is a characteristic physical value corresponding to the driving wheel and the weight of a vehicle in order to calculate the second feedforward torque.

The inertia moment of a vehicle may be a characteristic value of a vehicle which is predetermined and inputted into the second feedforward controller 30. The second feedforward torque may be calculated from the inertial moment of a vehicle and the change rate of the target speed by Equation (5) below.

$$T_{ff2} = J_{vehicle} \times \dot{w}_{ref} \quad (5)$$

Here, $T_{ff2}$ denotes the second feedforward torque, and the $J_{vehicle}$ denotes the inertia moment of a vehicle. Also, $\dot{w}_{ref}$ denotes the change rate of the target speed. The change rate of the target speed may be obtained by converting the target speed into units of rad/s and differentiating the target speed in units of rad/s.

Meanwhile, when the second feedforward controller 30 determines the second feedforward torque for changing the actual vehicle speed in accordance with the variation of the target speed, the second feedforward controller 30 may determine a speed profile in a section where the previous target speed changes into the final target speed, and may allow the torque to gently ascend and descend in the initial section and final section of the speed change in order to prevent a sense of incompatibility according to the rapid acceleration and deceleration due to the rapid speed change.

Figure 5:
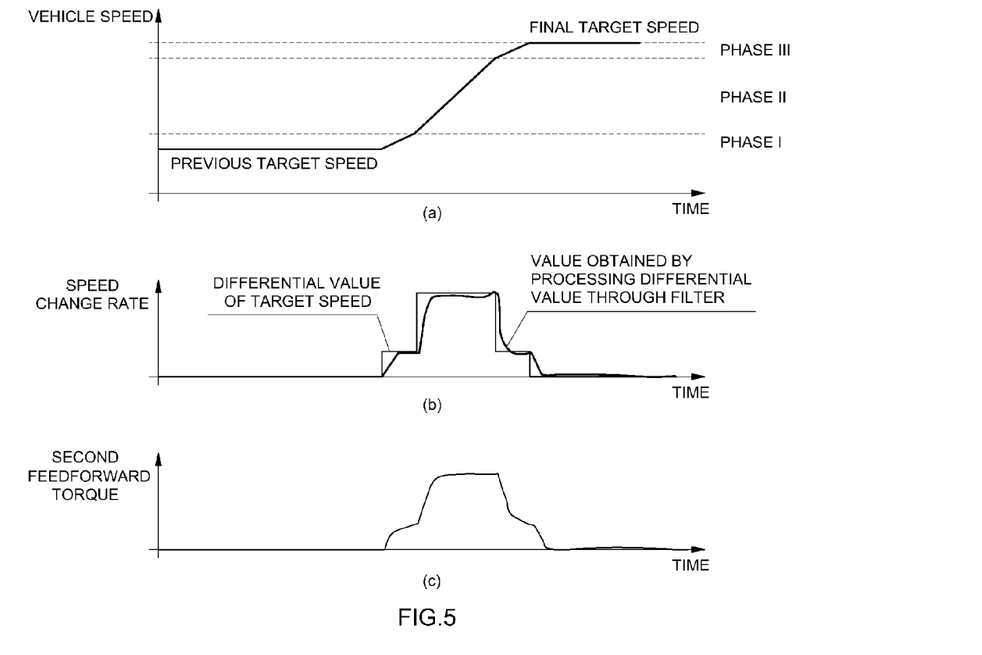
FIG. 5 is a view illustrating a method of determining a second feedforward torque according to embodiments of the present disclosure.

That is, as shown in FIG. 5A, the change section of the target speed may be divided into torque control sections, i.e., three phase sections including an initial speed change section from the previous target speed to a set speed change amount, a final speed change section from the final target speed to a set speed change amount, and an intermediate speed change section therebetween. In this case, upon control of the auto cruise speed of a vehicle, the second feedforward torque may be generated so as to gently change in the initial speed change section and the final speed change section. Further, the speed change rate obtained by differentiating the target speed converted into units of rad/s may be processed through filters including a low pass filter, rate filter, and the like, and then may be multiplied by the inertia moment of a vehicle to determine the second feedforward torque.

As shown in FIG. 5B, when the differential value of the target speed is processed through the filter, the second feedforward torque multiplied by the inertia moment of a vehicle may be smoothly shaped, and finally, the vehicle speed profile of three phases may be smoothed. Thus, the feedback controller, i.e., PID controller (or PI controller), may determine the feedback torque for removing an error between the target speed and the current speed, and the first feedforward controller 20 may determine the first feedforward torque for dealing with the drive resistance of a vehicle. In addition, when the second feedforward controller 30 determines the second feedforward torque for dealing with the variation of the target speed, the auto cruise torque (i.e., wheel required torque) for maintaining the vehicle speed at the target speed may be finally determined as a value which is the sum of the feedback torque, the first feedforward torque and the second feedforward torque determined as above.

Finally, the auto cruise speed control apparatus 1 may output a command for generating a wheel required torque corrected by adding the first feedforward torque and the second feedforward torque to the feedback torque. Thus, the output torque of the power unit (e.g., motor and/or internal combustion engine) may be controlled through cooperative control with other controllers according to the command.

Figure 6:
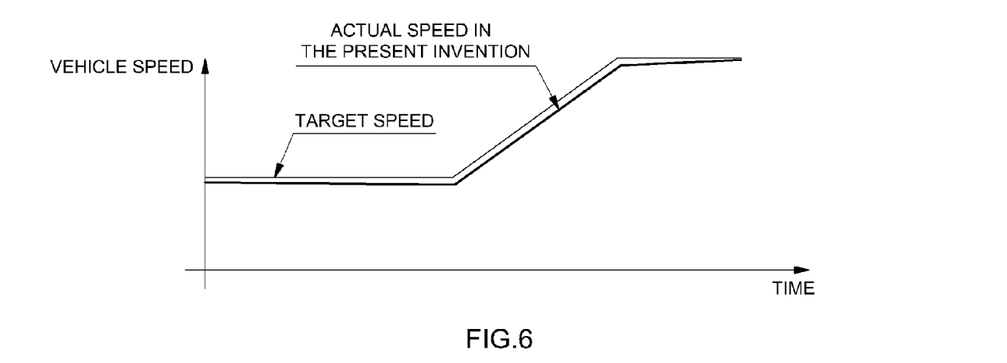
FIG. 6 is a graph illustrating an effect according to embodiments of the present disclosure.

FIG. 6 is a view illustrating effects according to embodiments of the present disclosure. As shown in FIG. 6, the vehicle speed may be controlled by additionally generating the feedforward torque in consideration of the inertia moment of a vehicle according to the variation of the target speed during the auto cruise control. Thus, the control response can be improved in a section where the target speed changes.

Thus, in the apparatus and method for controlling the auto cruise speed of a vehicle according to embodiments of the present disclosure, the vehicle speed can be controlled by additionally generating the feedforward torque considering the inertia moment of a vehicle according to the variation of the target speed during the auto cruise control. Accordingly, the auto cruise control performance can be improved in the section where the target speed changes (e.g., in a form of lamp), and the control response and the speed follow-up performance in regard to the target speed can be improved.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for controlling an auto cruise speed of a vehicle, comprising:
   a feedback controller determining a feedback torque for correcting a speed error between a target speed set by a driver of the vehicle and a current speed that is a feedback speed detected by a speed sensor of the vehicle;
   a first feedforward controller determining a drive resistance from the target speed and determining a first feedforward torque from the determined drive resistance, wherein the drive resistance is based on a rolling resistance, an air resistance, and a slope resistance; and
   a second feedforward controller determining a second feedforward torque based on a vehicle inertia and a variation of the target speed,
   wherein the apparatus outputs a command for generating a wheel required torque that is corrected by adding the first feedforward torque and the second feedforward torque to the feedback torque,
   wherein the second feedforward torque is determined by multiplying a change rate of the target speed, which is a differential value of the target speed obtained upon a change of the target speed by an inertia moment of the vehicle,
   wherein the first feedforward torque is a torque corresponding to the drive resistance, and
   wherein the output torque of a power unit is controlled based on the command.

2. The apparatus of claim 1, wherein the drive resistance is determined as a sum of an air resistance that is determined in accordance with the target speed and a rolling resistance that is determined in accordance with a weight of the vehicle.

3. The apparatus of claim 1, wherein the drive resistance is determined as a sum of the air resistance that is determined in accordance with the target speed, the rolling resistance that is determined in accordance with a weight of the vehicle, and the slope resistance that is determined in accordance with a road inclination angle calculated from a vehicle acceleration and a longitudinal acceleration sensed by a longitudinal acceleration sensor of the vehicle.

4. The apparatus of claim 1, wherein the second feedforward controller determines the second feedforward torque by converting the target speed in units of km/h into a speed in units of rad/s, differentiating the converted target speed with respect to time to obtain the change rate of the target speed, and multiplying the change rate of the target speed by the inertia moment of the vehicle.

5. A method for controlling an auto cruise speed of a vehicle, comprising:
   determining a feedback torque for correcting a speed error between a target speed set by a driver of the vehicle and a current speed that is a feedback speed detected by a speed sensor of the vehicle;
   determining a drive resistance from the target speed, wherein the drive resistance is based on a rolling resistance, an air resistance, and a slope resistance;
   determining a first feedforward torque from the determined drive resistance;
   determining a second feedforward torque based on a vehicle inertia and a variation of the target speed by inputting the target speed; and
   outputting a command for generating a wheel required torque that is corrected by adding the first feedforward torque and the second feedforward torque to the feedback torque,
   wherein the second feedforward torque is determined by multiplying a change rate of the target speed, which is a differential value of the target speed obtained upon a change of the target speed by an inertia moment of the vehicle,
   wherein the first feedforward torque is a torque corresponding to the drive resistance, and
   wherein the output torque of a power unit is controlled based on the command.

6. The method of claim 5, further comprising determining the drive resistance by calculating a sum of the air resistance that is determined in accordance with the target speed and the rolling resistance that is determined in accordance with a weight of the vehicle.

7. The method of claim 5, further comprising determining the drive resistance by calculating a sum of the air resistance that is determined in accordance with the target speed, the rolling resistance that is determined in accordance with a weight of the vehicle, and the slope resistance that is determined in accordance with a road inclination angle calculated from a vehicle acceleration and a longitudinal acceleration sensed by a longitudinal acceleration sensor of the vehicle.

8. The method of claim 5, wherein the determining of the second feedforward torque comprises converting the target speed in units of km/h into a speed in units of rad/s, differentiating the converted target speed with respect to time to obtain a change rate of the target speed, and multiplying the change rate of the target speed by the inertia moment of the vehicle.

9. The method of claim 5, wherein the determining of the second feedforward torque upon the change of the target speed of the vehicle comprises:

processing a change rate obtained by differentiating the target speed through a filter; and multiplying the processed change rate by an inertial moment of the vehicle, such that the second feedforward torque changes in an initial speed change section from a previous target speed by a first predetermined speed change amount and changes in a final speed change section from a final target speed by a second predetermined speed change amount, the initial speed change section and the final speed change section being within a speed change section where the previous target speed changes into the final target speed.

10. A non-transitory computer readable medium containing program instructions for controlling an auto cruise speed of a vehicle, the non-transitory computer readable medium comprising:

program instructions that determine a feedback torque for correcting a speed error between a target speed set by a driver of the vehicle and a current speed that is a feedback speed detected by a speed sensor of the vehicle;

program instructions that determine a drive resistance from the target speed, wherein the drive resistance is based on a rolling resistance, an air resistance, and a slope resistance;

program instructions that determine a first feedforward torque from the determined drive resistance;

program instructions that determine a second feedforward torque based on a vehicle inertia and a variation of the target speed by inputting the target speed; and program instructions that output a command for generating a wheel required torque that is corrected by adding the first feedforward torque and the second feedforward torque to the feedback torque, wherein the second feedforward torque is determined by multiplying a change rate of the target speed, which is a differential value of the target speed obtained upon a change of the target speed by an inertia moment of the vehicle, wherein the first feedforward torque is a torque corresponding to the drive resistance, and wherein the output torque of a power unit is controlled based on the command.

* * * * *